(12) United States Patent
Lucas

(10) Patent No.: US 8,176,469 B2
(45) Date of Patent: May 8, 2012

(54) INTER LANGUAGE INTEROPERABILITY USING A VARIANT TYPE

(75) Inventor: Terry Leonard Lucas, Snohomish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 1020 days.

(21) Appl. No.: 11/744,134

(22) Filed: May 3, 2007
(Under 37 CFR 1.47)

(65) Prior Publication Data
US 2008/0134153 A1 Jun. 5, 2008

Related U.S. Application Data

(60) Provisional application No. 60/797,535, filed on May 4, 2006.

(51) Int. Cl.
*G06F 9/44* (2006.01)
(52) U.S. Cl. ........................ 717/108; 717/114; 717/116
(58) Field of Classification Search ........................ None
See application file for complete search history.

(56) References Cited

U.S. PATENT DOCUMENTS

| | | | | |
|---|---|---|---|---|
| 5,732,270 A * | 3/1998 | Foody et al. | ............... | 719/316 |
| 6,055,370 A * | 4/2000 | Brown et al. | ............... | 717/142 |
| 6,167,565 A * | 12/2000 | Kanamori | ............... | 717/146 |
| 6,314,429 B1 * | 11/2001 | Simser | ............... | 717/163 |
| 6,754,884 B1 * | 6/2004 | Lucas et al. | ............... | 717/108 |
| 7,058,645 B2 * | 6/2006 | Seto et al. | ............... | 1/1 |
| 7,096,419 B2 * | 8/2006 | Barnes et al. | ............... | 715/234 |
| 7,194,485 B2 * | 3/2007 | Kaipa et al. | ............... | 1/1 |
| 7,194,729 B2 * | 3/2007 | Stone et al. | ............... | 717/108 |
| 7,454,743 B2 * | 11/2008 | Fuchs | ............... | 717/108 |
| 7,543,271 B2 * | 6/2009 | Gadre | ............... | 717/116 |
| 7,546,335 B2 * | 6/2009 | Moeller et al. | ............... | 709/201 |
| 7,669,184 B2 * | 2/2010 | Bracha et al. | ............... | 717/116 |
| 7,669,191 B1 * | 2/2010 | Kelly et al. | ............... | 717/140 |
| 2002/0073399 A1 * | 6/2002 | Golden | ............... | 717/114 |
| 2003/0106041 A1 * | 6/2003 | Stone et al. | ............... | 717/108 |
| 2003/0110446 A1 * | 6/2003 | Nemer | ............... | 715/513 |
| 2004/0015840 A1 * | 1/2004 | Walker | ............... | 717/108 |
| 2004/0015849 A1 * | 1/2004 | Sanchez, II | ............... | 717/116 |
| 2004/0177160 A1 * | 9/2004 | Seto et al. | ............... | 709/246 |
| 2004/0255267 A1 * | 12/2004 | Meijer | ............... | 717/106 |
| 2005/0010902 A1 * | 1/2005 | Takacsi-Nagy et al. | ............... | 717/114 |
| 2005/0114394 A1 * | 5/2005 | Kaipa et al. | ............... | 707/104.1 |
| 2005/0149914 A1 * | 7/2005 | Krapf et al. | ............... | 717/136 |
| 2006/0225053 A1 * | 10/2006 | Lakshman et al. | ............... | 717/140 |
| 2009/0254601 A1 * | 10/2009 | Moeller et al. | ............... | 709/201 |

OTHER PUBLICATIONS

Robert Iafore, Object-Oriented Programming in C++ second Edition publised in 1995 by Waite Group Press, pp. 464-465, 713-716, 729-733.*

Gilad Bracha, Making the future safe for the past: adding genericity to the Java programming language, 1998 ACM, pp. 183-200, <http://dl.acm.org/citation.cfm?id=286957>.*

Frank Buddrus, Cappuccino—A C++ to Java Translator, 1998 ACM 0-89791-969, pp. 660-665, <http://dl.acm.org/citation.cfm?id=331015>.*

(Continued)

*Primary Examiner* — Thuy Dao
*Assistant Examiner* — Cuong V Luu
(74) *Attorney, Agent, or Firm* — Squire Sanders (US) LLP

(57) ABSTRACT

A container can be used to atomically convert types of values to pass the values between programs of different programming languages. Different programs written in different programming languages can pass the values by reference to a container and can use an accessor method associated with the container to convert the values to a desired format.

17 Claims, 2 Drawing Sheets

OTHER PUBLICATIONS

Hai Jiang, Data Conversion for Process/Thread Migration and Checkpointing, 2003 IEEE, 8 pages, <http://ieeexplore.ieee.org/stamp/stamp.jsp?tp=&arnumber=1240612>.*

Jingyu Hou, Object-Oriented Representation for XML Data, 0-7695-1128-7/01 2001 IEEE, pp. 40-49, <http://ieeexplore.ieee.org/stamp/stamp.jsp?tp=&arnumber=945148>.*

Elizabeth Chang, Visual Modeling of Behavioral Properties in the LVM for XML Using XSemantic Nets, 2006 IEEE, 11 pages, <http://ieeexplore.ieee.org/stamp/stamp.jsp?tp=&arnumber=4041621>.*

Gordon P. Gu, From UML to LQN by XML algebra-based model transformations, 2005 ACM 1-59593-087-6/05/0007, pp. 99-110, <http://dl.acm.org/citation.cfm?id=1071021.1071031>.*

* cited by examiner

INTER LANGUAGE INTEROPERABILITY USING A VARIANT TYPE

CLAIM OF PRIORITY

This application claims priority from the following copending application, which is hereby incorporated in their entirety:

U.S. Provisional Application No. 60/797,535 entitled INTER LANGUAGE INTEROPERABILITY USING A VARIANT TYPE, filed by John C. Schneider et al., filed May 4, 2006.

BACKGROUND OF INVENTION

Large software projects can often include multiple components written in different software languages. One difficulty in interacting between these components is that of handling values stored in different formats.

DETAILED DESCRIPTION

One embodiment of the present invention is a method to store variables for use with different programming languages comprising passing by reference to a container and using an accessor method associated with the container to convert the values to a desired format.

Figure 1:
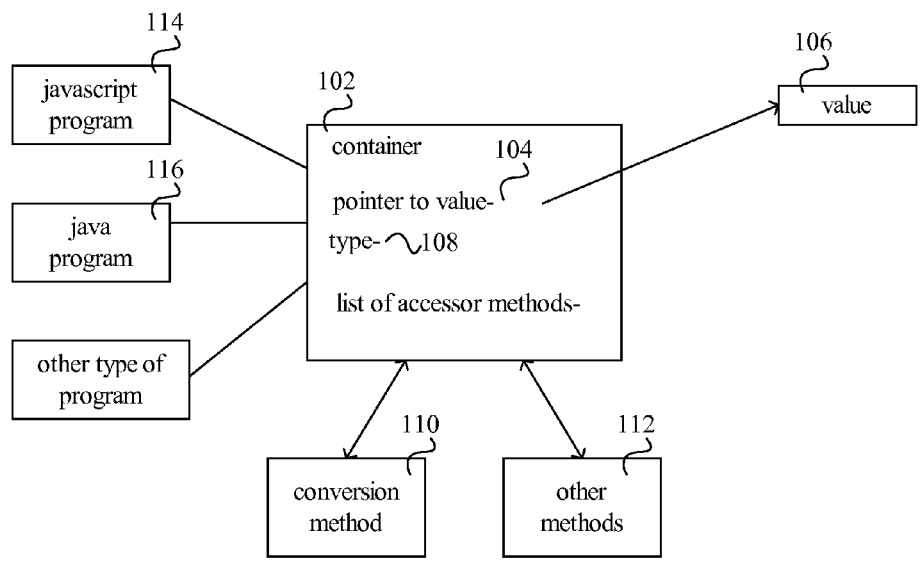
FIG. 1 shows the use of a container that allows values to be passed between programs in different languages.

FIG. 1 shows an example of a container 102. The container 102 can include a value indication, such as a pointer 104 to value 106, and a type indication 108. The container can have associated accessor methods 110 and 112 that can be used to access the container 102. The associated accessor methods can be external or internal to the container. The associated accessor methods can include getter and setter methods. The methods can include methods to convert the value into a desired format.

In one embodiment, different programs written on different programming computers can pass by reference the value between themselves. The containers with the associated accessor methods can convert the value to the desired format. In one embodiment, this can be done in a way to isolate the programmer from the details of the value type.

In one embodiment, programs written in different programming languages can use the container to pass values. For example, a JavaScript program 114 can provide a value using the container 102 to a Java program 116. The container 102 can be used to convert the type of the value as needed. In one embodiment, the container can attempt to convert the type of the value to allow an instruction to occur without an error. For example, if a value with a date type is to be added to an integer, the value with a date type, for example, can be converted into an integer type then optionally converted back into a date type.

Figure 2:
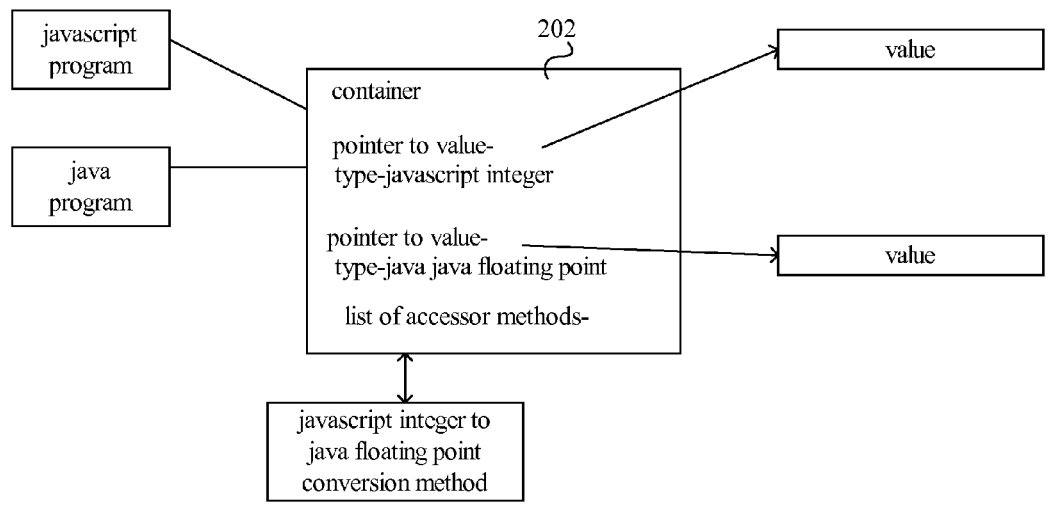
FIG. 2 shows one example of a container with associated accessor methods.

The container in FIGS. 1 and 2 show a pointer to a value in the container. Alternately, the container can store the value itself.

FIG. 2 shows an example with a container 202 that maintains the value in multiple type formats at the same time. Alternately, the value and type can be switched in the container with the container only maintaining one value and type.

Figure 3:
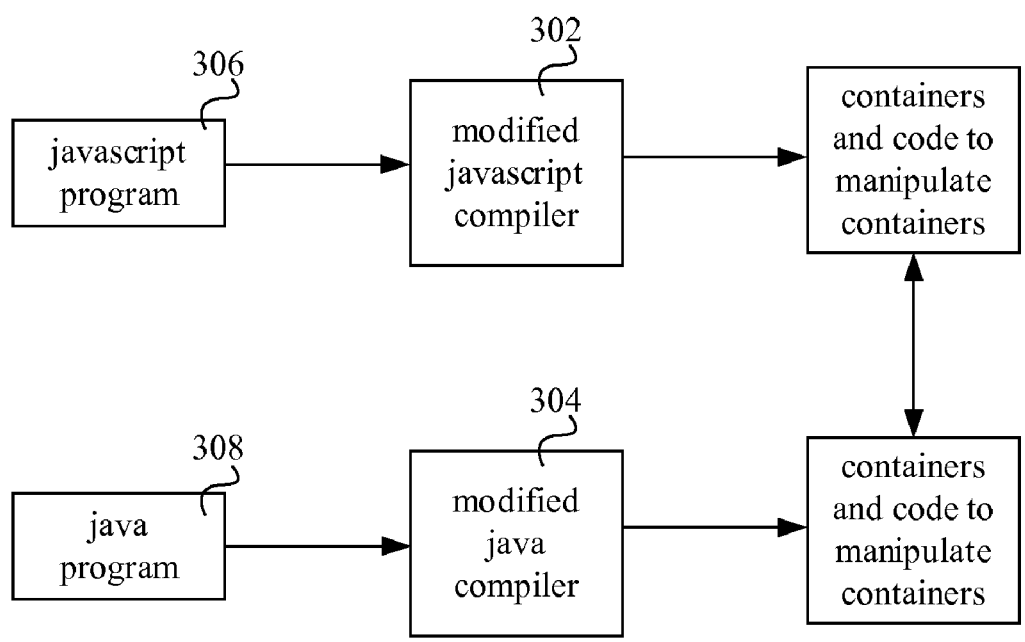
FIG. 3 shows a complier that creates the containers for use by programs in different programming languages.

FIG. 3 shows compilers 302 and 304 for programs 306 and 308 that have been modified such that each compiler creates a container and code to manipulate the containers from the high level language such as Java or JavaScript.

The code and containers are interoperable such that the container can be used to robustly pass values between programs of different programming languages.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROM's, EEPROM's, DRAMSs, flash memory devices, magnetic or optical cards, Nano systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method executable by a processor to store values for use with different programming languages comprising:
   passing by reference a value to a container, the container containing a value indication, wherein the value is of a first type and a first high-level programming language format;
   using an accessor method associated with the container to convert the value to a second type and a second high-level programming language format, wherein the first type is different from the second type, and wherein the first high-level programming language format is different from the second high-level programming language format, wherein the accessor method comprises getter and setter methods; and maintaining the value as the first type and the first high-level programming language format and as the second type and the second high-level programming language format within the container at a same time.

2. The method of claim 1, wherein the container is created by a compiler for one of the programming languages.

3. The method of claim 2, wherein the compiler also creates code that interacts with the container.

4. The method of claim 1, wherein the container has associated accessor methods for different high level instructions.

5. The method of claim 4, wherein at least some of the associated accessor methods for high level instructions can convert the values associated with the container to types appropriate for the high level instructions.

6. A non-transitory computer-readable medium having a container stored thereon for passing a value between different programming languages, the container comprising:

an value indication; and a type indication; wherein the container has associated accessor methods including conversion methods to convert the value from a first type to a second type and from a first high-level programming language format to a second high-level programming language format, wherein the first type is different from the second type, wherein the first high-level programming language format is different from the second high-level programming language format, and wherein the associated accessor methods comprise getter and setter methods; and wherein the container maintains the value as the first type and the first high-level programming language format and as the second type and the second high-level programming language format within the container at a same time.

7. The non-transitory computer-readable medium of claim 6, wherein the value indication is a pointer to a value.

8. The non-transitory computer-readable medium of claim 6, wherein the value indication is data.

9. The non-transitory computer-readable medium of claim 6, wherein the container is created by a compiler for one of the programming languages.

10. The non-transitory computer-readable medium of claim 9, wherein the compiler creates code that interacts with the container.

11. The non-transitory computer-readable medium of claim 6, wherein the container has associated accessor methods for different high level instructions.

12. The non-transitory computer-readable medium of claim 11, wherein at least some of the associated accessor methods for high level instructions can convert the values associated with the container to types appropriate from the high level instructions.

13. A system comprising:

a processor;

a compiler, implemented on the processor, to convert a high level language into code, the code including a container and code to pass by reference a value to the container; wherein the container includes a value indication; and a type indication; wherein the container has associated accessor methods including conversion methods to convert the value from a first type to a second type and from a first high-level programming language format to a second high-level programming language format, wherein the first type is different from the second type, wherein the first high-level programming language format is different from the second high-level programming language format, and wherein the associated accessor methods comprise getter and setter methods; and wherein the container maintains the value as the first type and the first high-level programming language format and as the second type and the second high-level programming language format within the container at a same time.

14. The system of claim 13, wherein the value indication is a pointer to a value.

15. The system of claim 13, wherein the value indication is data.

16. The system of claim 13, wherein the container has associated accessor methods for different high level instructions.

17. The system of claim 16, wherein at least some of the associated accessor methods for high level interactions can convert the values associated with the container to types appropriate from the high level instructions.

* * * * *

UNITED STATES PATENT AND TRADEMARK OFFICE
CERTIFICATE OF CORRECTION

PATENT NO. : 8,176,469 B2  Page 1 of 1
APPLICATION NO. : 11/744134
DATED : May 8, 2012
INVENTOR(S) : Lucas It is certified that error appears in the above-identified patent and that said Letters Patent is hereby corrected as shown below:

On the Title page, Item (56), under "Other Publications", line 2, delete "publised" and insert -- published --, therefor.

In column 2, line 7-9, delete "The code and containers are interoperable such that the container can be used to robustly pass values between programs of different programming languages." and insert the same on Col. 2, Line 6, after "JavaScript." as a continuation of the same paragraph.

In column 4, line 42, in Claim 17, delete "interactions" and insert -- instructions --, therefor.

Signed and Sealed this
Thirty-first Day of July, 2012

David J. Kappos
*Director of the United States Patent and Trademark Office*